US010908662B2

(12) United States Patent
Amano

(10) Patent No.: US 10,908,662 B2
(45) Date of Patent: Feb. 2, 2021

(54) POWER RECEIVING APPARATUS, METHOD OF CONTROLLING POWER RECEIVING APPARATUS, AND STORAGE MEDIUM

(71) Applicant: CANON KABUSHIKI KAISHA, Tokyo (JP)

(72) Inventor: Yuto Amano, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 100 days.

(21) Appl. No.: 16/170,814

(22) Filed: Oct. 25, 2018

(65) Prior Publication Data

US 2019/0129485 A1    May 2, 2019

(30) Foreign Application Priority Data

Oct. 31, 2017   (JP) ................................ 2017-211161

(51) Int. Cl.
| G06F 1/26 | (2006.01) |
| G06F 1/3287 | (2019.01) |
| G06F 1/28 | (2006.01) |
| H04L 12/12 | (2006.01) |
| H04L 12/10 | (2006.01) |

(52) U.S. Cl.
CPC .............. G06F 1/263 (2013.01); G06F 1/28 (2013.01); G06F 1/3287 (2013.01); H04L 12/10 (2013.01); H04L 12/12 (2013.01)

(58) Field of Classification Search
CPC . G06F 1/26; G06F 1/263; G06F 1/266; G06F 1/00; H02J 3/06; H02J 4/00; H04L 12/10; G01R 19/00

USPC ............................ 307/80, 82, 81, 86, 66, 64
See application file for complete search history.

(56) References Cited

U.S. PATENT DOCUMENTS

| 2006/0143583 A1* | 6/2006 | Diab ..................... G06F 1/3209 713/300 |
| 2007/0170909 A1* | 7/2007 | Vorenkamp .............. H04B 3/44 324/76.11 |
| 2007/0220280 A1* | 9/2007 | Karam .................... H04L 12/10 713/300 |
| 2008/0005602 A1* | 1/2008 | Diab ..................... H04L 12/10 713/300 |
| 2008/0276104 A1* | 11/2008 | Hussain ................ G06F 1/266 713/300 |
| 2013/0031378 A1* | 1/2013 | Schindler .............. G06F 1/266 713/300 |

(Continued)

FOREIGN PATENT DOCUMENTS

JP           2012-95502 A       5/2012

*Primary Examiner* — Rexford N Barnie
*Assistant Examiner* — Jagdeep S Dhillon
(74) *Attorney, Agent, or Firm* — Canon U.S.A., Inc. I.P. Division

(57) ABSTRACT

It is necessary to suppress the interruption of the power supply when the power source is changed. A power receiving apparatus receives power from a first power source or a second power source, and one of power from the first power source and power converted by a voltage conversion unit is supplied to a load unit, based on a result of detection of whether the power receiving apparatus is connected to the first power source, a result of detection of whether the power receiving apparatus is connected to the second power source, and a voltage that can be supplied from the second power source.

9 Claims, 9 Drawing Sheets

(56) References Cited

U.S. PATENT DOCUMENTS

| | | | |
|---|---|---|---|
| 2014/0211832 A1* | 7/2014 | Diab | H04B 3/46 375/219 |
| 2015/0334652 A1* | 11/2015 | Prasad | H04W 8/24 370/311 |
| 2016/0064938 A1* | 3/2016 | Balasubramanian | H04L 12/10 307/11 |
| 2016/0127135 A1* | 5/2016 | Balasubramanian | H04L 12/40045 713/300 |
| 2016/0352101 A1* | 12/2016 | Koo | H02J 1/102 |
| 2018/0131182 A1* | 5/2018 | Vavilala | G06F 1/263 |
| 2018/0232030 A1* | 8/2018 | Chan | G06F 1/30 |
| 2019/0327101 A1* | 10/2019 | Picard | G06F 1/263 |

\* cited by examiner

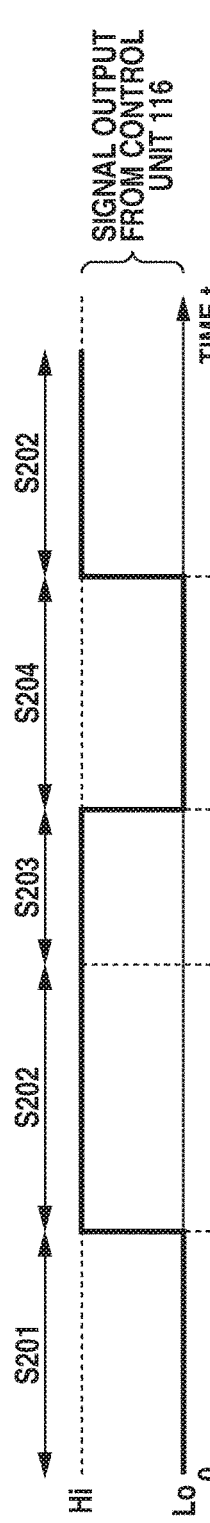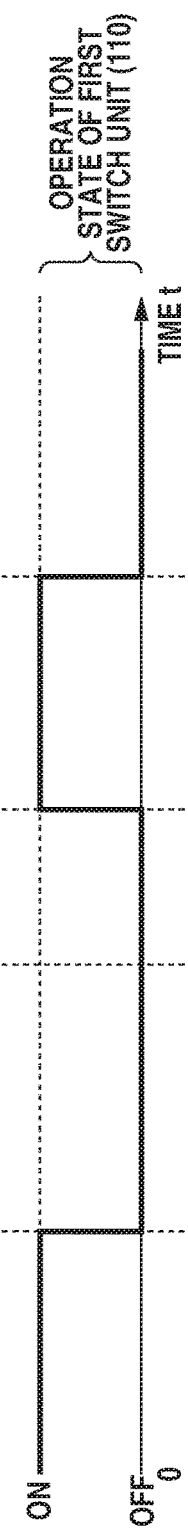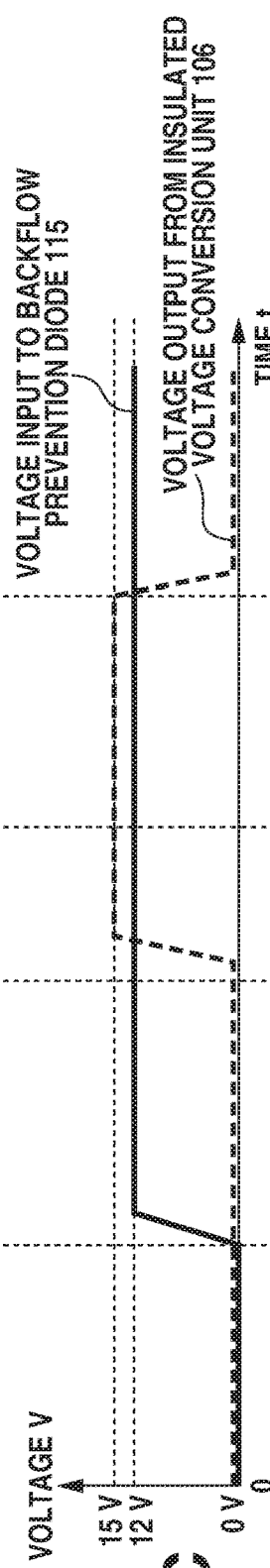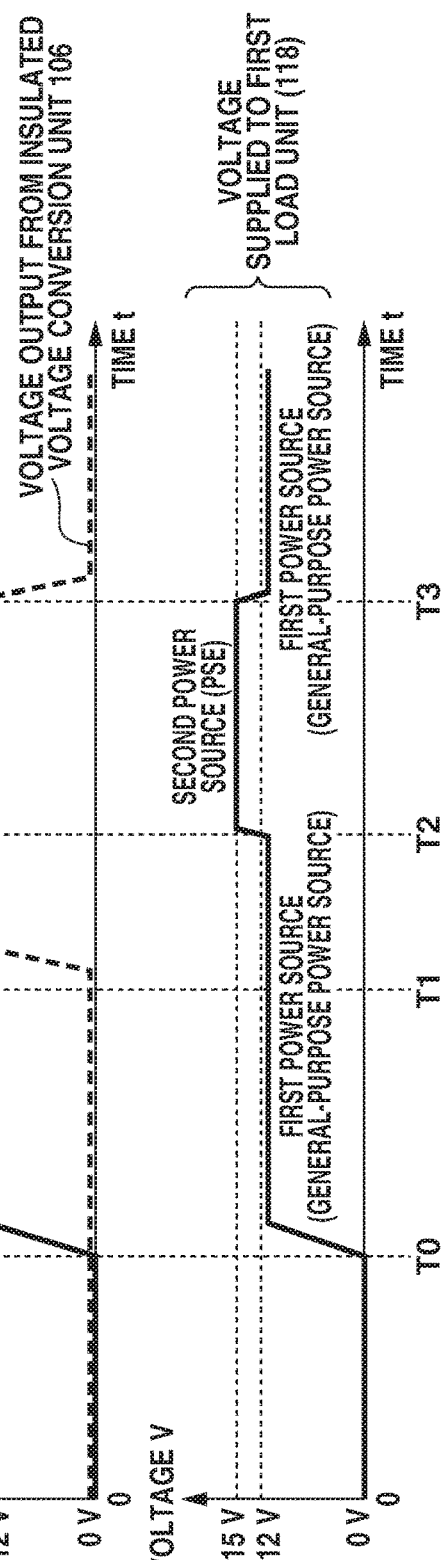

US 10,908,662 B2

POWER RECEIVING APPARATUS, METHOD OF CONTROLLING POWER RECEIVING APPARATUS, AND STORAGE MEDIUM

BACKGROUND

Field of the Invention

The present invention relates to a power receiving apparatus including a plurality of power sources, and in particular, to a technology to receive power by changing the power source from which power is supplied.

Description of the Related Art

In recent years, a technology to supply data and power using an Ethernet (registered trademark) cable is known. The technology conforms to Institute of Electrical and Electronics Engineers (IEEE) 802.3at defined as the international standard, and is referred to as Power over Ethernet (PoE, registered trademark). In the PoE technology, power is supplied from power sourcing equipment (PSE) serving as a power supplying apparatus to a powered device (PD) serving as a power receiving apparatus.

Further, power receiving apparatuses that can receive power from a plurality of power sources different in voltage have been known. For example, the power receiving apparatuses have been known that can receive power from a power source (PSE) corresponding to the PoE technology conforming to IEEE 802.3at and a general-purpose power source such as an alternating-current (AC) adapter, and select one of the power sources and receive power from the selected power source. In a case where a first power source (e.g., general-purpose power source) and a second power source (e.g., PSE) are connected at the same time, some of such power receiving apparatuses receive power from the second power source (e.g., Japanese Patent Application Laid-Open No. 2012-95502). In the case where the first power source and the second power source are connected at the same time and when the second power source is disconnected, the power receiving apparatus is switched to a state of being operated by the first power source. Further, when the first power source is connected and then the second power source is additionally connected, the power receiving apparatus is switched to a state of being operated by the second power source.

By the technology discussed in Japanese Patent Application Laid-Open No. 2012-95502, however, when the power receiving apparatus is connected to only the general-purpose power source and is supplied with power equal to or higher than 12.95 W from the general-purpose power source, power supplied from the PSE to the PD may be stopped.

More specifically, when the PSE is connected to the power receiving apparatus, the power source is changed over from the first power source to the second power source while all of functions of the power receiving apparatus are operated by the first power source. As a result, a current equal to or larger than a limit value of 400 mA flows from the PSE to the PD immediately after the changeover. At this time, a function of preventing overcurrent works in the PSE, which stops power supply from the PSE to the PD in some cases.

SUMMARY

According to an aspect of the present disclosure, a power receiving apparatus receives power from a first power source or a second power source, and includes a first detection unit configured to detect whether the power receiving apparatus is connected to the first power source, a second detection unit configured to detect whether the power receiving apparatus is connected to the second power source, and to detect an amount of power that can be supplied from the second power source, a voltage conversion unit configured to convert a voltage of the power supplied from the second power source, a switch unit configured to supply to a load unit one of the power from the first power source and the power converted by the voltage conversion unit, and a control unit configured to control the switch unit based on detection results of the first detection unit and the second detection unit.

Further features of the present disclosure will become apparent from the following description of exemplary embodiments with reference to the attached drawings.

BRIEF DESCRIPTION OF THE DRAWINGS

FIGS. 8A to 8D are timing charts illustrating the processing by the control unit, the operation state of the first switch unit, a voltage input to a backflow prevention diode, a voltage output from an insulated voltage conversion unit, and a voltage supplied to the first load unit.

DESCRIPTION OF THE EMBODIMENTS

The first exemplary embodiment is described in detail below with reference to accompanying drawings.

Figure 1:
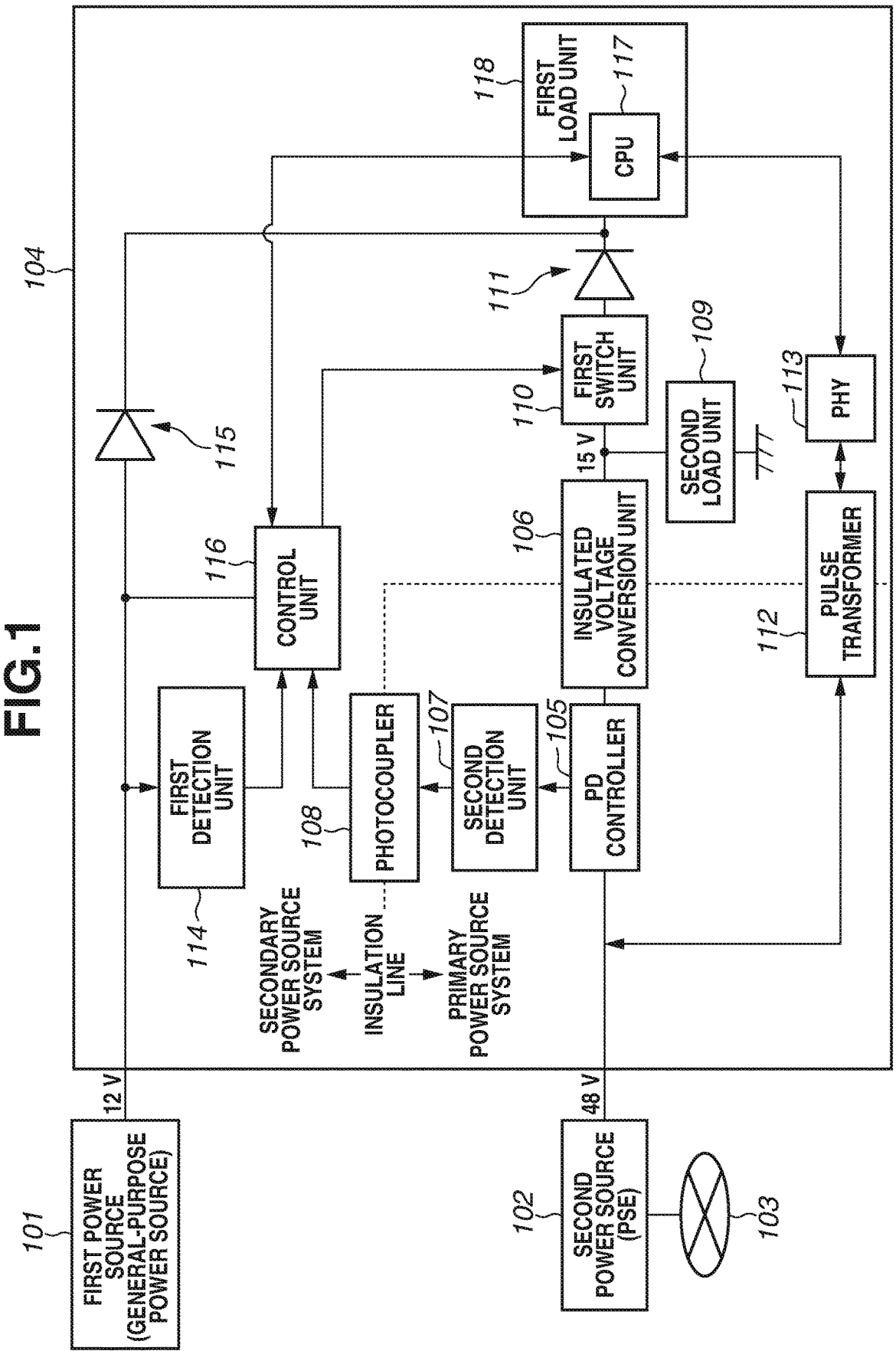
FIG. 1 is an outline diagram illustrating a configuration of a power receiving apparatus.

FIG. 1 is a diagram illustrating an outline configuration of an information processing system that includes a power receiving apparatus according to the present exemplary embodiment. A power receiving apparatus 104 is connected to a first power source (general-purpose power source) 101 such as an alternating current/direct current (AC/DC) adapter, a second power source (power sourcing equipment (PSE)) 102 that performs power supply conforming to the IEEE 802.3at standard, and an internet protocol (IP) communication network 103. In the present exemplary embodiment, the PSE power source 102 is a switching hub to which a plurality of Ethernet cable connectors is connectable (multiple ports), and which can perform communication through a transmission control protocol/internet protocol (TCP/IP) and power supply corresponding to the Power over Ethernet (PoE) standard.

In the IEEE 802.3at standard, a powered device (PD, power receiving apparatus) can select the maximum power to be supplied from the PSE to the PD in the PoE technology. When selecting Type 1 (Type 1 standard), the PD can receive power up to 12.95 W from the PSE. On the other hand, when selecting Type 2 (Type 2 standard), the PD can receive power up to 25.5 W from the PSE. Two-stage class detection by the physical layer or the data link layer (using a link layer discovery protocol (LLDP)) is used for the selection of Type 1 or Type 2. In the following, processing of selecting Type 1 or Type 2 through the two-stage class detection of the physical layer and the LLDP of the data link layer is referred to as "negotiation".

When the PD is connected to the PSE, the PSE performs a negotiation process complying with the IEEE 802.3at standard, and then starts to supply power to the PD. In a case where the PD selects Type 2, the PSE includes a function of stopping the power supply until the negotiation process ends, in order to prevent an excessive current from flowing.

The power receiving apparatus includes a configuration conforming to the above-described negotiation specification, and performs the negotiation while performing initialization of the apparatus, etc., immediately after start-up. Therefore, all of the functions of the power receiving apparatus do not work immediately after the start up, and the power receiving apparatus is required to perform the negotiation within the limited current value.

The power receiving apparatus 104 is configured such that a secondary power source system including the first power source (hereinafter, referred to as general-purpose power source) 101 and a primary power source system including the second power source (hereinafter, referred to as PSE power source) 102 are insulated from each other.

The power receiving apparatus 104 further includes a central processing unit (CPU) 117 that controls the LLDP processing with the PSE power source 102, data communication with a counterpart apparatus through the IP communication network, transmission of an output signal to a control unit 116, imaging operation by the power receiving apparatus 104, etc.

The power receiving apparatus 104 further includes a first load unit 118 that includes an image sensor, an image processing integrated circuit (IC), a storage, the CPU 117, etc.

The power receiving apparatus 104 further includes an insulated voltage conversion unit 106 that converts a voltage of a PD controller 105 and a voltage of the PSE power source 102. The PD controller 105 performs hardware negotiation with the PSE power source 102.

The power receiving apparatus 104 further includes a second detection unit 107 and a photocoupler 108. The second detection unit 107 detects that the PSE power source 102 is connected, and detects a two-stage class detection signal. The photocoupler 108 transmits a detection result of the second detection unit 107 from the primary power source system to the secondary power source system.

The power receiving apparatus 104 further includes a second load unit 109 and a first switch unit 110. The second load unit 109 is provided between the insulated voltage conversion unit 106 and the first load unit 118. The first switch unit 110 is provided between the insulated voltage conversion unit 106 and the first load unit 118.

The power receiving apparatus 104 further includes a backflow prevention diode 111 provided between the insulated voltage conversion unit 106 and the first load unit 118.

The power receiving apparatus 104 further includes a pulse transformer 112 and a physical layer (PHY) 113 that are provided to enable communication between the CPU 117 and the counterpart apparatus through the PSE power source 102 and the IP communication network 103.

The power receiving apparatus 104 further includes a first detection unit 114 and a backflow prevention diode 115. The first detection unit 114 detects that the general-purpose power source 101 is connected. The backflow prevention diode 115 is provided between the general-purpose power source 101 and the first load unit 118.

The power receiving apparatus 104 further includes the control unit 116 that controls the first switch unit 110 based on the detection result of each of the first detection unit 114 and the second detection unit 107, and a control signal from the CPU 117.

In the present exemplary embodiment, a voltage output from the PSE power source 102 is 48 V, a voltage output from the general-purpose power source 101 is 12 V, and a voltage output from the insulated voltage conversion unit 106 is 15 V. In addition, the control unit 116 is supplied with power and performs predetermined operation only when the general-purpose power source 101 is connected.

The CPU 117 includes a function of performing LLDP data communication, and can perform the negotiation with the PSE power source 102 using the function. The control unit 116 is mutually communicable with the CPU 117, and the CPU 117 can accordingly recognize a start timing of the negotiation through the LLDP.

Further, the first switch unit 110 is in an ON state unless a signal is provided from the control unit 116.

Detailed operation performed by the blocks in the above-described configuration will be described below.

Figure 2:
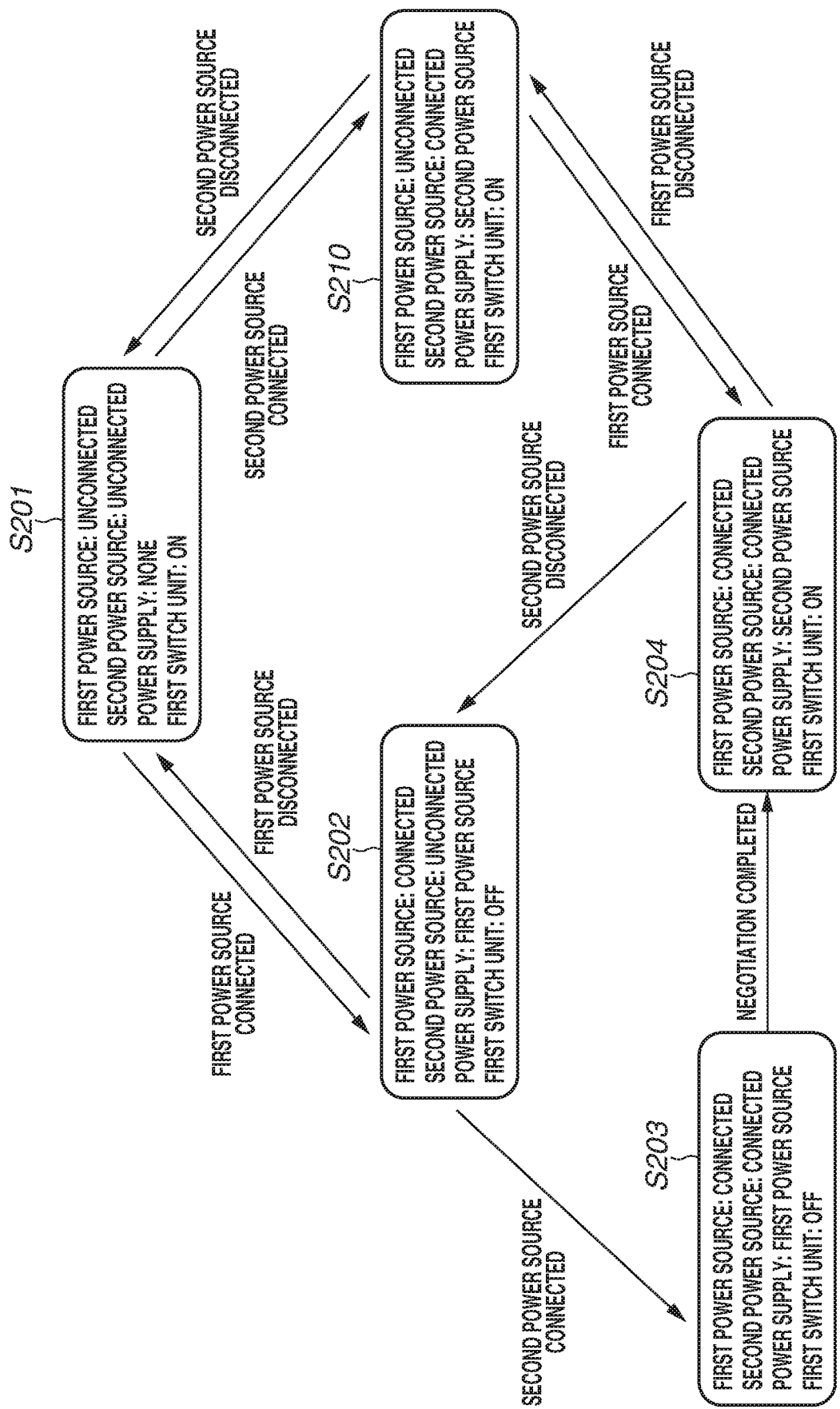
FIG. 2 is a state transition diagram illustrating change of a connection state of a power source, an operation state of a first switch unit, and a state of power supply to a first load unit.

FIG. 2 is a state transition diagram illustrating the operation state of each of the first and second power sources and the first switch unit 110 in FIG. 1, and change of the power supply to the first load unit 118. Each of arrows in the drawing indicates a condition of corresponding state transition.

State S201 in FIG. 2 indicates a state where both of the general-purpose power source 101 and the PSE power source 102 are unconnected. In this state, the power is obviously not supplied to the first load unit 118 from either power source. As described above, the first switch unit 110 is in the ON state because a signal is not provided from the control unit 116 to the first switch unit 110.

In a case where the general-purpose power source 101 is connected in the state S201 in FIG. 2, the state transitions to a state S202. After the transition, the state of the general-purpose power source 101 is changed to a connected state, and the power is supplied from the general-purpose power source 101. At this time, the first switch unit 110 is changed from the ON state to OFF state.

When the general-purpose power source 101 is disconnected in the state S202, the state transitions to the state S201. In this state transition, the first switch unit 110 is changed from the OFF state to the ON state because the power supply to the control unit 116 is stopped and the signal provided for the first switch unit 110 is stopped.

In a case where the PSE power source 102 is connected in the state S202, the state transitions to a state S203. After the transition, the state of the PSE power source 102 is changed to the connected state but the power is continuously supplied from the general-purpose power source 101. In the state S203, the first switch unit 110 is still in the OFF state.

When the negotiation is completed in the state S203, the state transitions to a state S204 in FIG. 2. In the state S204, the first switch unit 110 is put into the ON state, and the power is supplied from the PSE power source 102.

When the PSE power source 102 is disconnected in the state S204, the state transitions to the state S202.

After the transition, the PSE power source 102 is in the unconnected state, and the power is supplied from the general-purpose power source 101. The first switch unit 110 is changed from the ON state to the OFF state.

In a case where the PSE power source 102 is connected in the state S201, the state transitions to a state S210. After the transition, the state of the PSE power source 102 is in the connected state, and the power is supplied from the PSE power source 102. In the state S210, the first switch unit 110 is still in the ON state.

When the PSE power source 102 is disconnected in the state S210, the state transitions to the state S201. In this state transition, the first switch unit 110 is not switched. The first switch unit 110 therefore is still in the ON state in the state S201.

In a case where the general-purpose power source 101 is connected in the state S210, the state transitions to the state S204. The power is supplied to the control unit 116 because of connection of the general-purpose power source 101; however, if the control unit 116 has already detected connection of the PSE power source 102 at this time, the control unit 116 does not output a signal to switch the first switch unit 110.

Accordingly, the first switch unit 110 is still in the ON state at this time, and the power is continuously supplied from the PSE power source 102.

When the general-purpose power source 101 is disconnected in the state S204, the state transitions to the state S210. In this state transition, the power supply from the PSE power source 102 is continued. At this time, changeover of the power source is not performed, and the first switch unit 110 is still in the ON state.

Figure 3:
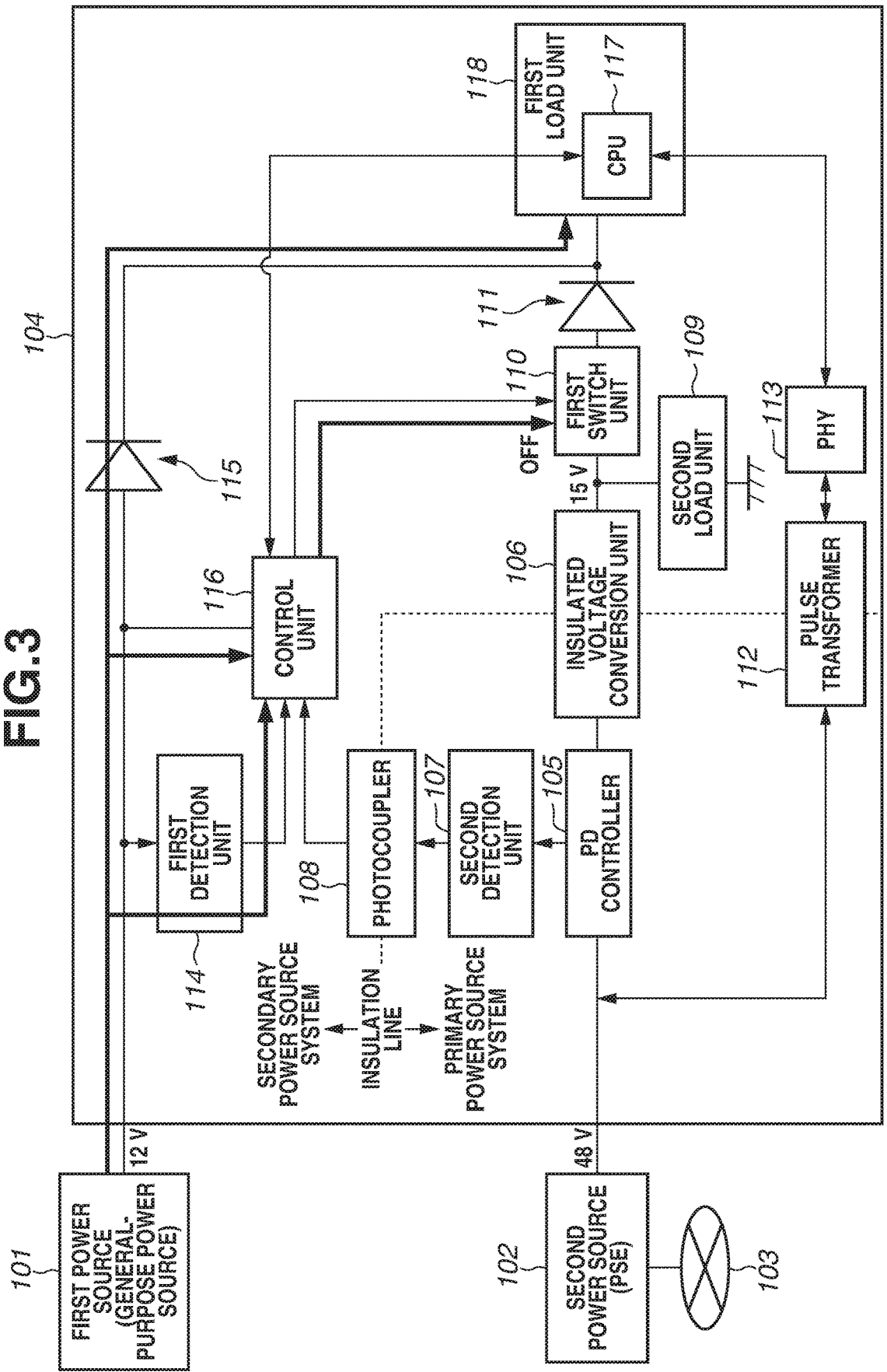
FIG. 3 is a schematic diagram illustrating a power supply state in a case where only a general-purpose power source is connected.

FIG. 3 illustrates the operation state of the first switch unit 110 and the power supply state in the state S202 in FIG. 2. In the case where the power is supplied from the general-purpose power source 101 while the power is not supplied from the PSE power source 102, the power is supplied to the first load unit 118 through the backflow prevention diode 115. When the power is supplied, the CPU 117 in the first load unit 118 starts initialization, and performs predetermined operation after the initialization. At this time, when the power is supplied from the general-purpose power source 101, the first detection unit 114 detects the power supplied from the general-purpose power source 101. The control unit 116 changes the first switch unit 110 to the OFF state based on a result of detection by the first detection unit 114.

Figure 4:
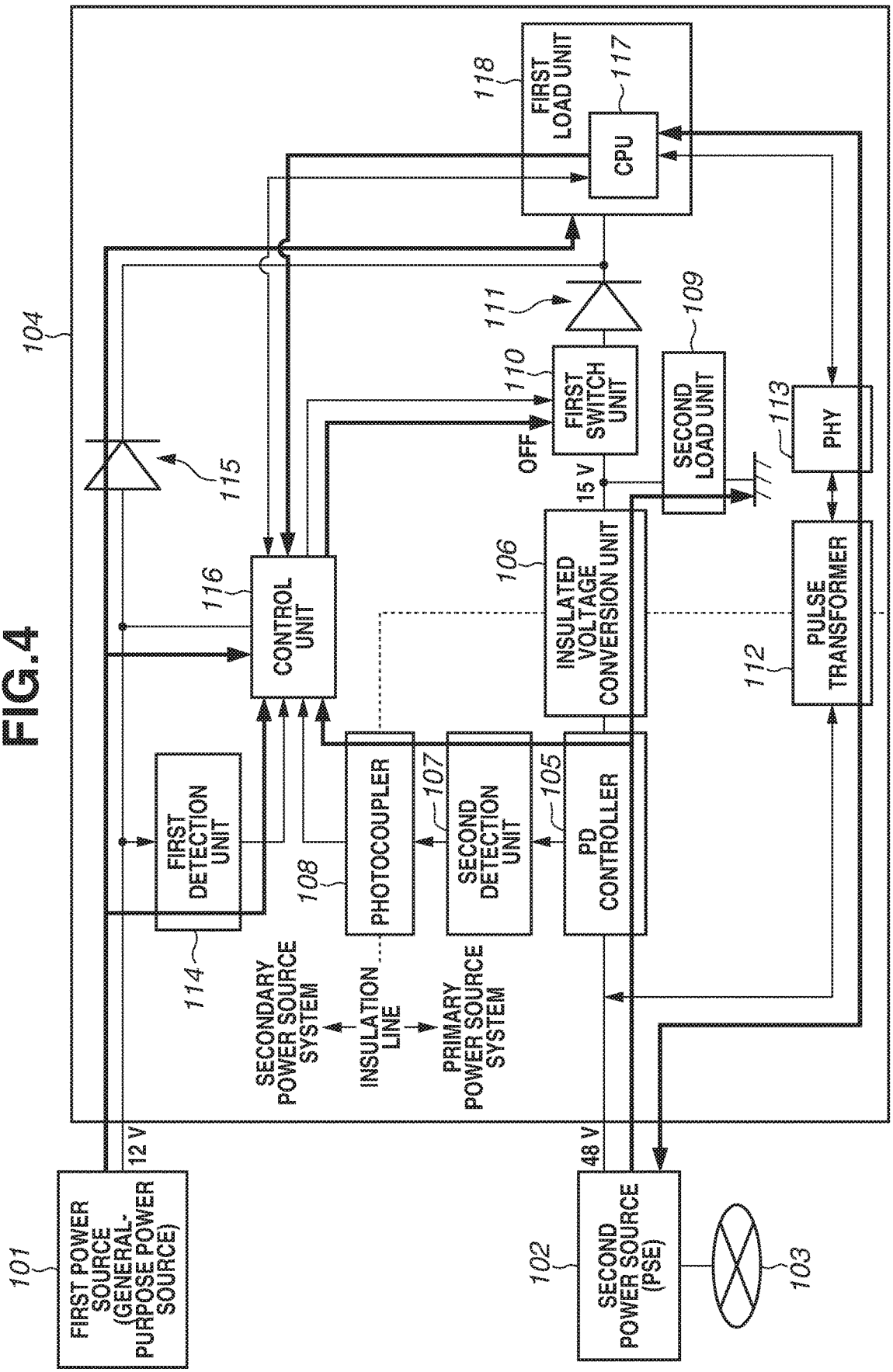
FIG. 4 is a schematic diagram illustrating a power supply state in a case where a power sourcing equipment (PSE) power source and the general-purpose power source are both connected, and delay processing and negotiation through a link layer discovery protocol (LLDP) are performed.

FIG. 4 illustrates the operation state of the first switch unit 110 and the power supply state in the state S203 in FIG. 2. When the PSE power source 102 is connected in the state S202, the state transitions to the state S203 as illustrated in FIG. 4. Operation at this time will be described below. After the PSE power source 102 is connected, the PD controller 105 performs negotiation with the PSE power source 102, and the PSE power source 102 starts to supply the power to the second load unit 109. When the power supply from the PSE power source 102 is started, the insulated voltage conversion unit 106 starts operation and outputs a voltage of 15 V. In a case where the power receiving apparatus 104 already receives the power from the general-purpose power source 101, the power is supplied from the PSE power source 102 to the second load unit 109 because the first switch unit 110 is in the OFF state. At this time, a current flows through the second load unit 109 in order to consume the minimum load current defined by IEEE 802.3at. Further, when the power supply from the PSE power source 102 is started, the power receiving apparatus performs the two-stage class detection or the negotiation through the LLDP of the data link layer, according to the PSE power source 102 because the power receiving apparatus is a power receiving apparatus of Type 2. During the two-stage class detection or the negotiation through the LLDP of the data link layer, the consumption current is limited to 400 mA because the power receiving apparatus can receive power only as Type 1. The two-stage class detection is performed by the PD controller 105. The negotiation through the LLDP of the data link layer is performed with the second power source 102 by the CPU 117 through the PHY 113 and the pulse transformer 112 using the LLDP.

Figure 5:
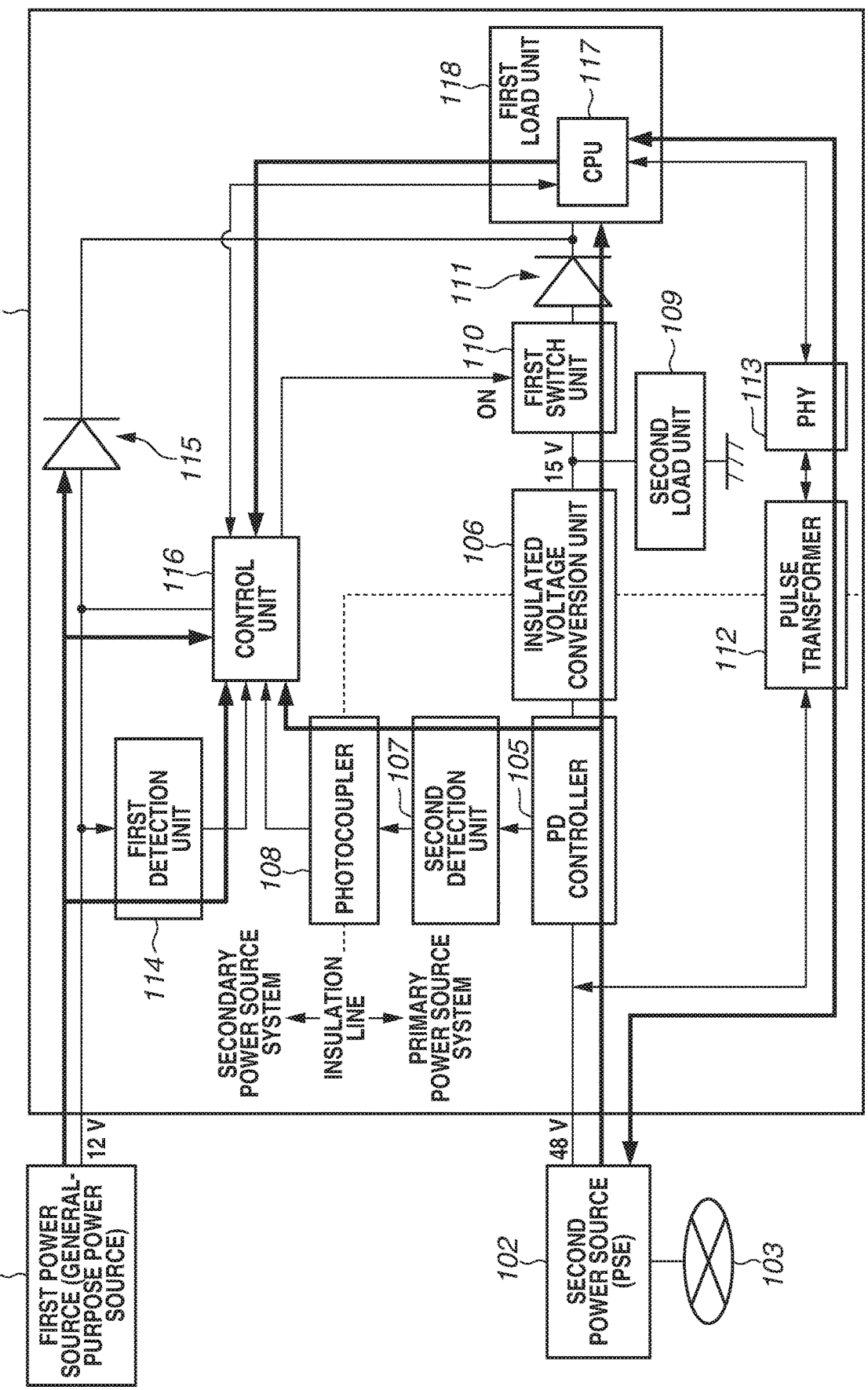
FIG. 5 is a schematic diagram illustrating a power supply state in a case where the general-purpose power source and the PSE power source are both connected.

FIG. 5 illustrates the operation state of the first switch unit 110 and the power supply state in the state S204 in FIG. 2. The control unit 116 includes a function of detecting whether the two-stage class detection and the negotiation through the LLDP of the data link layer have been completed. When the two-stage class detection and the negotiation through the LLDP of the data link layer are normally completed, the power receiving apparatus 104 is recognized as the power receiving apparatus of Type 2, and becomes able to receive the power of a current as required in the negotiation. When the control unit 116 detects completion of the negotiation, the control unit 116 changes the first switch unit 110 from the OFF state to the ON state. At this time, the voltage (15 V) output from the insulated voltage conversion unit 106 passes through the first switch unit 110 and the backflow prevention diode 111. Since the voltage is higher than the voltage (12 V) provided from the general-purpose power source 101, the power is supplied preferentially from the voltage (15 V) output from the insulated voltage conversion unit 106 by the OR diode configuration of the backflow prevention diode 115 and the backflow prevention diode 111. In other words, as illustrated in FIG. 5, the power is preferentially supplied from the PSE power source 102.

Figure 6:
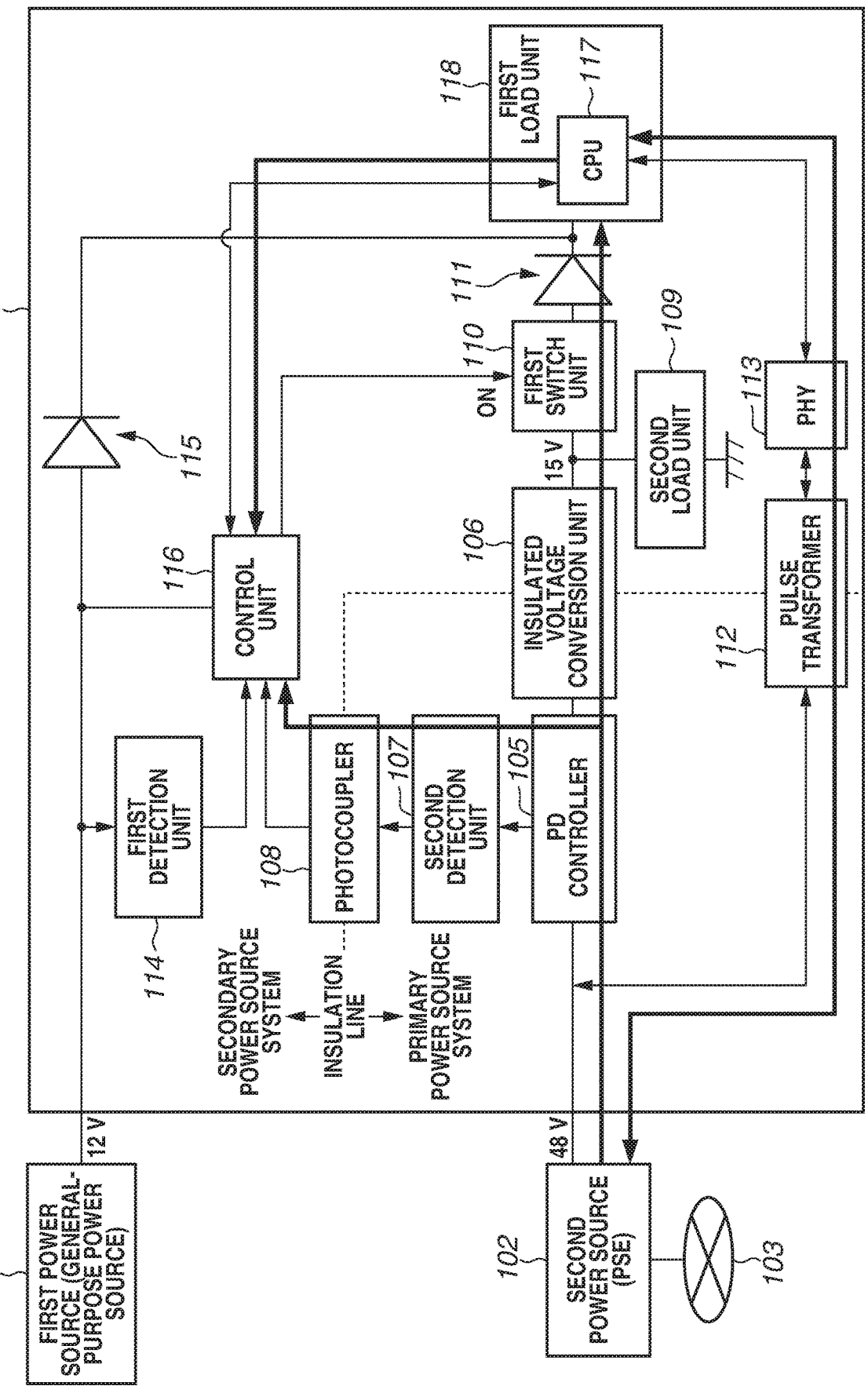
FIG. 6 is a schematic diagram illustrating a power supply state in a case where only the PSE power source is connected.

FIG. 6 illustrates the operation state of the first switch unit 110 and the power supply state in the state S210 in FIG. 2. In a case where the PSE power source 102 is connected while the power is not supplied from the general-purpose power source 101, the negotiation with the PSE power source 102 is performed by the PD controller 105, and the power supply from the PSE power source 102 is started. When the power supply from the PSE power source 102 is started, the insulated voltage conversion unit 106 starts operation and outputs a voltage of 15 V.

In the case where the power is not supplied from the general-purpose power source 101, the power is supplied to the first load unit 118 through the first switch unit 110 and the backflow prevention diode 111 because the first switch unit 110 is in the ON state. When the power is supplied, the CPU 117 in the first load unit 118 starts initialization to perform initialization operation. Since the power receiving apparatus is a power receiving apparatus of Type 2, the power receiving apparatus performs two-stage hardware negotiation or LLDP negotiation according to the PSE power source 102 after the power supply from the PSE power source 102 is started. During the two-stage hardware negotiation or the LLDP negotiation, the consumption current is limited to 400 mA because the power receiving apparatus can receive power only as Type 1. During this time, the initialization of the CPU 117 is performed, and operation is not performed with all of the functions. The two-stage hardware negotiation is performed by the PD controller 105. The LLDP negotiation is performed with the second power source 102 by the CPU 117 through the PHY 113 and the pulse transformer 112 using the LLDP. After the two-stage hardware negotiation or the LLDP negotiation is normally completed, the PSE power source 102 recognizes the power receiving apparatus 104 as the power receiving apparatus of Type 2, and the power receiving apparatus 104 becomes able to receive the power of the current as required in the negotiation.

Figure 7:
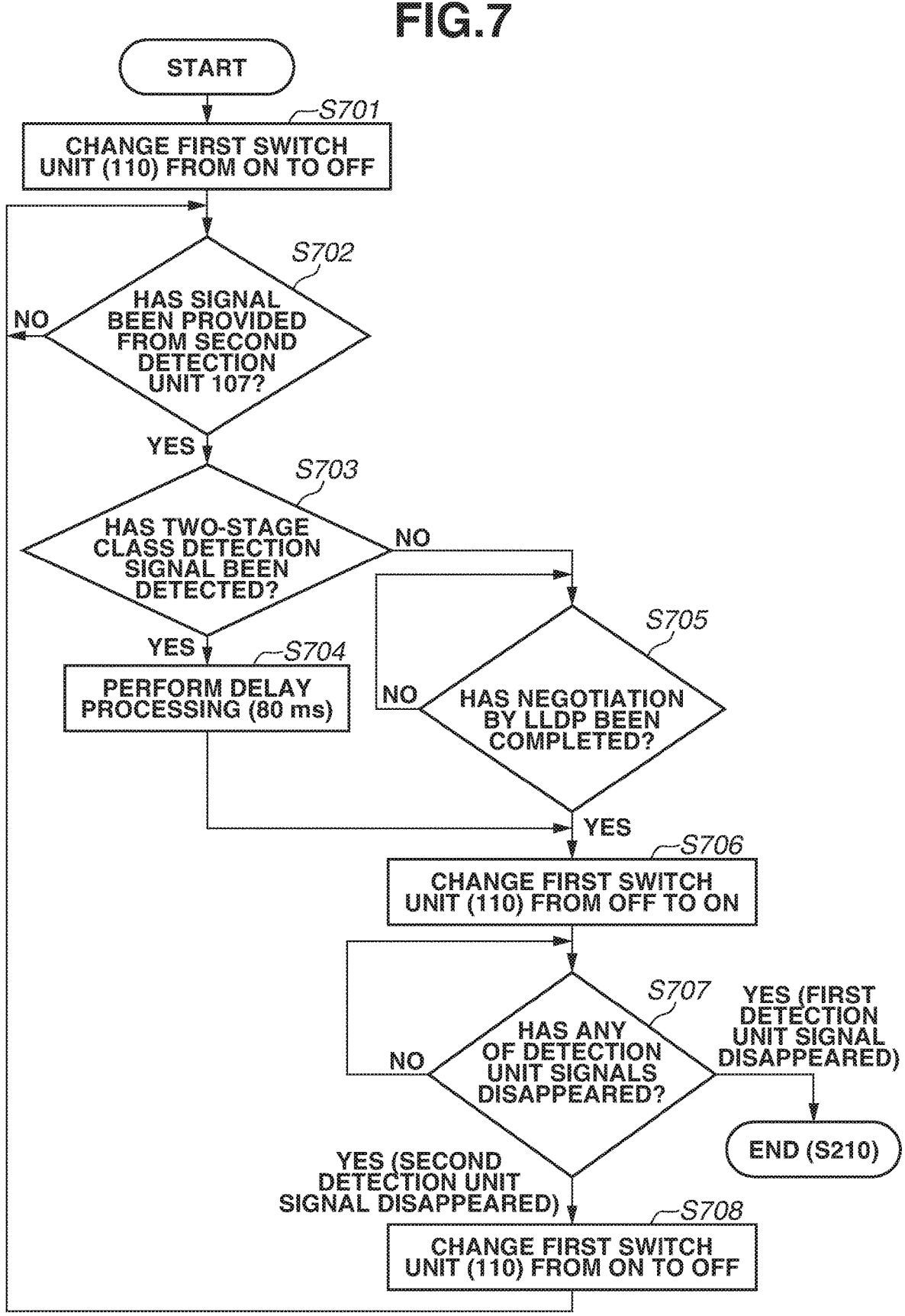
FIG. 7 is a flowchart illustrating processing by a control unit.

FIG. 7 is a flowchart illustrating the processing by the control unit 116 in the state transition in order of the states S202, S203, S204, and S202 or in the order of the states S202, S203, S204, and S210, as illustrated in FIG. 2. The control unit 116 is supplied with power from the general-purpose power source 101. A time point when the general-purpose power source 101 therefore is connected in the state S201 and the power supply to the control unit 116 is started is denoted as START of the flowchart. It is assumed that, in the state where the general-purpose power source 101 is not connected (default state), the first switch unit 110 is in the ON state. In step S701, the control unit 116 first changes the first switch unit 110 from the ON state to the OFF state after the control unit 116 receives power. In step S702, the control unit 116 determines the presence or absence of a signal from the second detection unit 107 after the processing in step S701. In a case where the control unit 116 detects the signal from the second detection unit 107 (YES in step S702), the control unit 116 confirms the presence or absence of a two-stage class detection signal in step S703. In a case where the control unit 116 detects the two-stage class detection signal (YES in step S703), a processing delay of 80 msec is performed in S704, in order to prevent a rush current and then switching is performed. In contrast, in a case where the control unit 116 does not detect the two-stage class detection signal (NO in step S703), the control unit 116 is put into a state of waiting for completion of the negotiation using the LLDP data communication in step S705. After the delay processing of 80 msec including switching in step S704 or the negotiation using the LLDP communication in step S705 is completed, the control unit 116 changes the first switch unit 110 from the OFF state to the ON state in step S706.

As a result, the PSE power source 102 starts to supply power to the first load unit 118. In addition, in step S707, the control unit 116 determines presence or absence of a signal from each of the first detection unit 114 and the second detection unit 107, after the processing in step S706. In a case where the PSE power source 102 is disconnected after the processing in step S706, i.e., in a case where notification from the second detection unit 107 disappears (YES in step S707), the control unit 116 changes the first switch unit 110 from the ON state to the OFF state in step S708. After the processing in step S708, the determination processing in step S702 is performed again, and operation is thereafter performed based on the continuous flow. In a case where the general-purpose power source 101 is disconnected after the processing in step S706, i.e., in a case where notification from the first detection unit 114 disappears (YES in step S707), the power supply to the control unit 116 is stopped. The state indicates the state S210 in FIG. 2, and the ON state of the first switch unit 110 is continued while the general-purpose power source 101 is not connected (default state). As a result, the control flow by the control unit 116 ends (END).

It is possible by the above-described processing by the control unit 116 to vary the switching timing of the first switch unit 110 depending on the type of the negotiation performed by the PSE.

FIG. 8A to 8D are four graphs illustrating a state of changeover of the power source in the state transition in order of the states S201, S202, S203, S204, and S202 in FIG. 2. In the graph of FIG. 8A, presence of the signal output from the control unit 116 is denoted by High, and absence of the output signal is denoted by Low. The graph of FIG. 8B illustrates the operation state of the first switch unit 110 associated with the signal from the control unit 116. In the graph of FIG. 8C, the vertical axis indicates the voltage (dashed line) output from the insulated voltage conversion unit 106 and the voltage (solid line) input to the backflow prevention diode 115. In the graph of FIG. 8D, the vertical axis indicates the voltage supplied to the first load unit 118.

The horizontal axis in each of the four graphs indicates a time t. When the time t is zero in each of the graphs, both of the power sources are unconnected. A time T0 indicates timing when the general-purpose power source 101 is connected. In other words, a period from 0 to T0 indicates the state S201 in FIG. 2. A time T1 indicates timing when the PSE power source 102 is connected and the negotiation is started. In other words, a period from T0 to T1 indicates the state S202 in FIG. 2. A time T2 indicates timing when the negotiation is completed. In other words, a period from T1 to T2 indicates the state S203 in FIG. 2. A time T3 indicates timing when the PSE power source 102 is disconnected. In other words, a period from T2 to T3 indicates the state S204 in FIG. 2, and a period after T3 indicates the state S202 in FIG. 2.

In the state S201, the power is not supplied from both of the power sources. Therefore, the signal output from the control unit 116 in FIG. 8A is Lo, the first switch unit 110 in FIG. 8B is in the ON state, the voltages in FIG. 8C are 0 V, and the voltage supplied to the first load unit 118 in FIG. 8D is also 0 V.

In the state S202, the voltage of 12 V is supplied from the general-purpose power source 101. Accordingly, the signal output from the control unit 116 in FIG. 8A becomes Hi, and the first switch unit 110 in FIG. 8B is put into the OFF state. The voltage input to the backflow prevention diode 115 in FIG. 8C becomes 12 V, and the voltage supplied to the first load unit 118 in FIG. 8D becomes about 12 V.

In the state S203, the PSE power source 102 is connected and the negotiation is performed. Therefore, the signal output from the control unit 116 in FIG. 8A is still Hi, and the first switch unit 110 in FIG. 8B is in the OFF state. The voltage output from the insulated voltage conversion unit 106 in FIG. 8C is changed from 0 V to 15 V in this period, and the voltage input to the backflow prevention diode 115 is not changed from 12 V. The voltage supplied to the first load unit 118 in FIG. 8D is not changed from about 12 V.

In the state S204, the negotiation has been completed. Therefore, the signal output from the control unit 116 in FIG. 8A becomes Lo, and the first switch unit 110 in FIG. 8B is put into the ON state. The voltages in FIG. 8C are not changed, but the voltage supplied to the first load unit 118 in FIG. 8D is changed to 15 V.

In the final state S202, the voltage of 12 V is supplied from the general-purpose power source 101. Accordingly, the signal output from the control unit 116 in FIG. 8A becomes Hi, and the first switch unit 110 in FIG. 8B is put into the OFF state. The voltage output from the insulated voltage conversion unit 106 in FIG. 8C is changed from 15 V to 0 V, and the voltage input to the backflow prevention diode 115 is 12 V. Further, the voltage supplied to the first load unit 118 in FIG. 8D becomes about 12 V.

As described above, in the case where the PSE power source 102 is connected in the state S201 in FIG. 2, it is possible to change over the power source without stopping power supply to the first load unit 118. Also in the case where the PSE power source 102 is disconnected in the state S204, it is similarly possible to change over the power source without stopping power supply to the first load unit 118.

Figure 9:
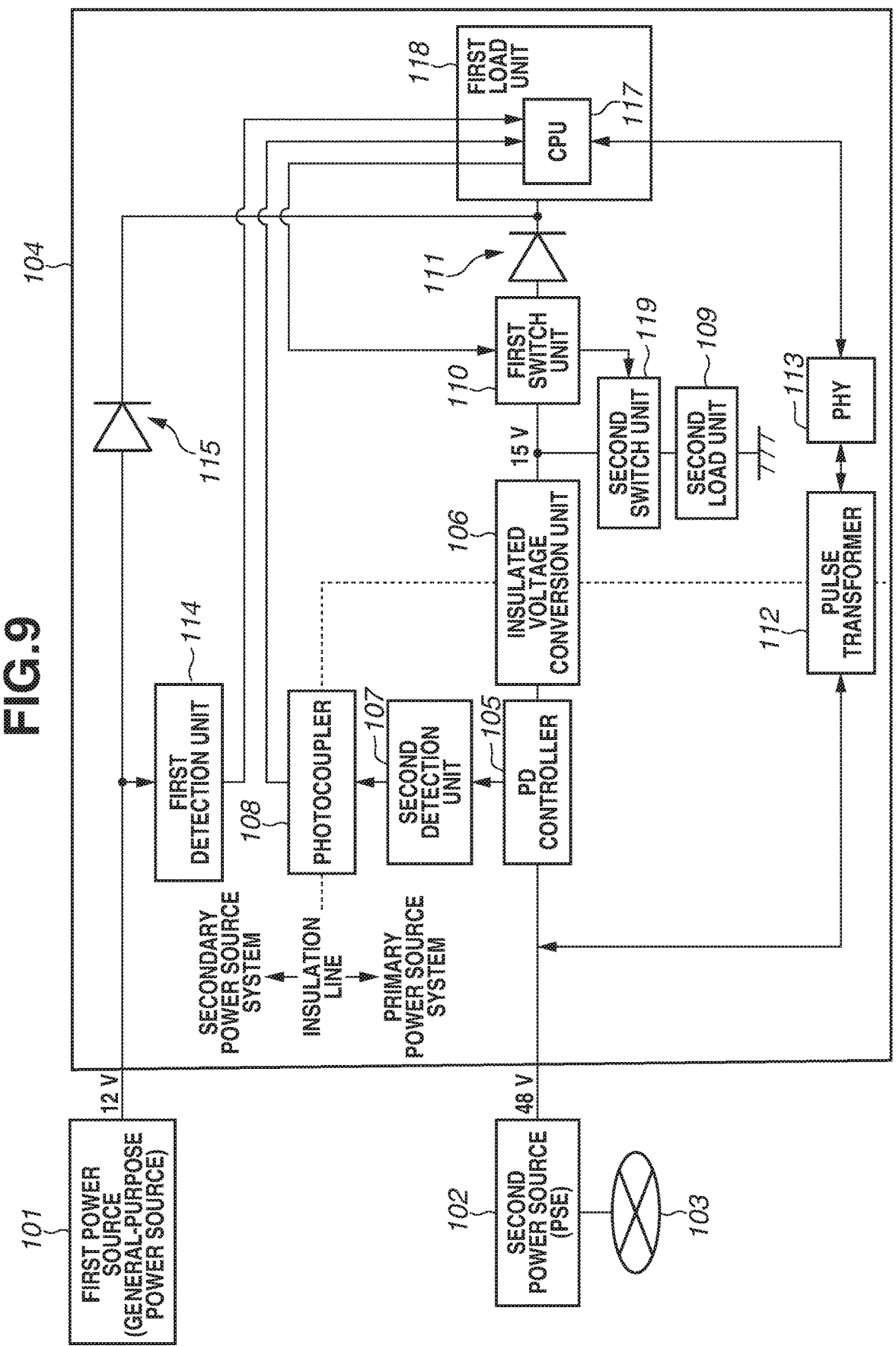
FIG. 9 is an outline diagram in a case where the power receiving apparatus includes a second switch unit and the first load unit includes a function of the control unit.

In a second exemplary embodiment, as illustrated in FIG. 9, a case will be described where the power receiving apparatus 104 includes a second switch unit 119 and the CPU 117 includes the function of the control unit 116 in addition to the configurations of the power receiving apparatus 104 described with reference to FIG. 1. A main configuration of each of the power sources according to the second exemplary embodiment is similar to the configuration in FIG. 1 according to the first exemplary embodiment. Hence, description thereof is omitted.

The second switch unit 119 is switched ON or OFF in conjunction with the first switch unit 110. When the first switch unit 110 is in the ON state, the second switch unit 119 is in the OFF state. When the first switch unit 110 is in the OFF state, the second switch unit 119 is in the ON state.

For example, in the case where both of the general-purpose power source 101 and the PSE power source 102 are connected as illustrated in FIG. 5, the first switch unit 110 is in the ON state as described above. At this time, the second switch unit 119 is put into the OFF state, which makes it possible to eliminate power consumption by the second load unit 109 and to improve power efficiency.

Further, during execution of the delay processing and the negotiation processing through the LLDP by the PSE power source 102 in the connection state as illustrated in FIG. 4, the first switch unit 110 is in the OFF state as described above, whereas the second switch unit 119 is in the ON state at this time. This allows the PSE power source 102 to supply power to the second load unit 109, and puts the PSE power source 102 into a state of stand-by to supply power to the first load unit 118. After the above-described processing is completed, the first switch unit 110 is put into the ON state, and the second switch unit 119 is put into the OFF state in conjunction with the first switch unit 110. By adopting such a configuration, the minimum load power is not constantly consumed but is consumed only when the PSE power source 102 is made to stand by. This improves power efficiency.

Further, in the second exemplary embodiment, the signal received by the control unit 116 in the first exemplary embodiment is received by the CPU 117 instead. In addition, the first switch unit is switched based on the signal output from the CPU. Such a configuration makes it possible to reduce power consumed by the control unit 116, and to accordingly improve power efficiency.

The exemplary embodiments of the present disclosure have been described above; however, the present disclosure is not limited to these exemplary embodiments and may be variously modified and alternated within the scope of the present disclosure.

The exemplary embodiments of the present disclosure make it possible to suppress overcurrent and interruption of the power supply with respect to the load unit of the power receiving apparatus immediately after changeover of the power source.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-211161, filed Oct. 31, 2017, which is hereby incorporated by reference herein in its entirety.

What is claimed is:

1. A power receiving apparatus receiving power from a first power source or a second power source provided via Ethernet, the power receiving apparatus comprising:
    a detection unit configured to detect whether the power receiving apparatus is connected to the second power source;
    a control unit configured to complete negotiation for selection of a class maximum power that can be supplied from the second power source, and to maintain supply from the first power source until the negotiation for selection of the class maximum power that can be supplied from the second power source is completed; and
    a switch unit configured to switch the power source for supplying power at the class maximum power to a load unit from the first power source to the second power source after the negotiation is completed.

2. The power receiving apparatus according to claim 1, wherein the second power source is a power sourcing equipment (PSE) conforming to Institute of Electrical and Electronics Engineers (IEEE) 802.3at.

3. The power receiving apparatus according to claim 1, further comprising a voltage conversion unit configured to convert a voltage of power supplied from the second power source to a voltage higher than a voltage of the power output from the first power source.

4. The power receiving apparatus according to claim 1, wherein, when the detection unit detects connection, the control unit sets a delay time and controls the switch unit switches the power source to the load unit when the delay time is expired.

5. The power receiving apparatus according to claim 4, wherein the delay time is a time based on an IEEE 802.3at Type 2 standard.

6. The power receiving apparatus according to claim 1, wherein, the negotiation is link layer discovery protocol (LLDP) negotiation based on an IEEE 802.3at Type 2 standard is completed.

7. A method of controlling a power receiving apparatus receiving power from a first power source or a second power source provided via Ethernet, the power receiving apparatus including a switch unit configured to switch the power source for supplying power to a load unit from the first power source to the second power source, the method comprising:

performing a detection to detect whether the power receiving apparatus is connected to the second power source;

performing control to complete negotiation for selection of the class maximum power that can be supplied from the second power source, and to maintain supply from the first power source until the negotiation for selection of the class maximum power that can be supplied from the second power source is completed; and controlling the switch unit to switch the power source for supplying power at the class maximum power to the load unit from the first power source to the second power source after the negotiation is completed.

8. The control method according to claim 7, wherein, when connection is detected in the detection, a delay time is set and the switch unit is controlled to switch the power source when the delay time is expired.

9. A non-transitory computer-readable storage medium storing a program causing a computer that receives power from a first power source or a second power source and includes a switch unit configured to switch the power source for supplying power to a load unit from the first power source to the second power source, to execute:

a detection to detect whether the computer is connected to the second power source, and to detect control to complete negotiation for selection of the class maximum power that can be supplied from the second power source, and to maintain supply from the first power source until the negotiation for selection of the class maximum power that can be supplied from the second power source is completed; and control of the switch unit to switch the power source for supplying power at the class maximum power to the load unit from the first power source to the second power source after the negotiation is completed.

* * * * *